United States Patent [19]

Hechenbleikner et al.

[11] Patent Number: 4,501,838

[45] Date of Patent: Feb. 26, 1985

[54] STABILIZED OLEFIN POLYMERS

[75] Inventors: Ingenuin Hechenbleikner, West Cornwall; William P. Enlow, Falls Village, both of Conn.

[73] Assignee: Borg-Warner Chemicals, Inc., Parkersburg, W. Va.

[21] Appl. No.: 418,104

[22] Filed: Sep. 14, 1982

Related U.S. Application Data

[63] Continuation of Ser. No. 262,267, May 11, 1981, abandoned.

[51] Int. Cl.³ ................................................ C08K 5/11
[52] U.S. Cl. .................................... 524/108; 524/303

[58] Field of Search ................................. 524/108, 303

[56] References Cited

U.S. PATENT DOCUMENTS 4,013,619 3/1977 Schmidt .............................. 524/108

Primary Examiner—John Kight
Assistant Examiner—Kriellion Morgan
Attorney, Agent, or Firm—Richard J. Schlott

[57] ABSTRACT

Thermal stabilization of olefin polymers, particularly polypropylene. Stabilization is accomplished by means of an ester of a pentaerythritol monoacetal. The ester contains a phenolic group.

5 Claims, No Drawings

STABILIZED OLEFIN POLYMERS

This is a continuation of application Ser. No. 262,267 filed May 11, 1981, abandoned.

This invention relates as indicated to stabilized olefin polymers. It relates particularly to stabilized polypropylene. Still more particularly, it relates to the use of certain phenolic esters as thermal stabilizers for polypropylene. The phenolic esters are derived by preparing monoacetals of pentaerythritol and then esterifying these monoacetals with either a carboxylic acid chloride or a dichlorophosphite. The phenolic group of the ester product resides in the aldehyde from which the intermediate monoacetal is obtained.

Generally, olefin polymer compositions are vulnerable to deterioration of physical and chemical properties during manufacture, storage, processing and use. To overcome such deterioration, or at least to inhibit it, there have been developed additive systems which act to stabilize these polymers with respect to physical and chemical degradation caused by exposure to ordinary environmental conditions. All of these additive systems, however, while effective for their intended purpose, are characterized by one or more shortcomings.

Olefin polymers are especially susceptible to oxidative degradation. The relatively high temperatures required for their customary processing procedures such as roll milling, injection molding, extrusion and the like, invariably promote oxidation because these processes are carried out under ordinary atmospheric conditions, i.e., they are exposed to the oxygen of the atmosphere.

The significance of polymer oxidation lies in the adverse effect it has on the rheology, morphology, color, clarity, gloss and other physical properties. Impact strength may be lost; the surface may become cracked or crazed. Even a darkening of the color may provide a sufficient aesthetic disadvantage as to render the olefin polymer composition unsuitable for its intended use.

U.S. Pat. No. 3,948,946 (Hofer et al.) shows acetals of hydroxybenzaldehydes. The acetals are the reaction products of 2,2-dimethyl-1,3-propanediol, pentaerythritol, ethylene glycol, 1,2-ethanedithiol, toluene-3,4-dithiol, etc. That is, the alcohol precursor is polyhydric. The reaction of pentaerythritol, however, is carried out to completion, i.e., all of the aliphatic hydroxy groups are acetalized. The acetals are said to be effective stabilizers for organic materials.

U.S. Pat. No. 4,013,619 (Schmidt) shows acetals of certain hydroxyphenylacetaldehydes and hydroxyphenylpropionaldehydes, in some instances (see Columns 16 and 17) with pentaerythritol residues. The acetals are either monoacetals or diacetals, but the monoacetals do not contain unreacted aliphatic hydroxy groups. The acetals are said to be effective heat stabilizers in synthetic resin compositions.

U.S. Pat. No. 4,151,211 (Hechenbleikner et al.) shows acetals of 4-hydroxyphenylpropionaldehydes and such hydroxy or mercapto compounds as pentaerythritol, dodecyl mercaptan and various other acetalizing reactants, as well as their use in stabilizing polypropylene. None of the acetals, however, contain unreacted aliphatic hydroxy groups.

French Pat. No. 2,310,558 shows certain diacetals of pentaerythritol and 3,5-ditertiarybutyl-4-hydroxypropionaldehyde and 3,5-ditertiarybutylbenzaldehyde.

The invention of this application is an ester of a pentaerythritol monoacetal having the structure

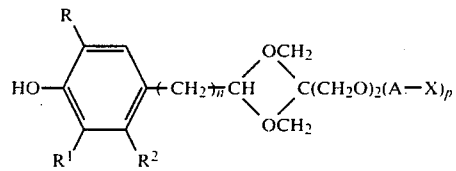

where R is alkyl, cycloalkyl or aralkyl having 3–10 carbon atoms, $R^1$ is alkyl or 1–6 carbon atoms, $R^2$ is lower alkyl or hydrogen, A is

or P—O, X is an organic radical, n is 0–3 and p is 1–2.

The invention also includes the process of preparing such esters comprising reacting a monoacetal of pentaerythritol having the structure

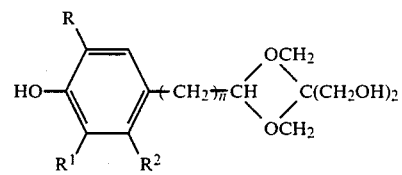

where R is alkyl, cycloalkyl or aralkyl having 3–10 carbon atoms, $R^1$ is alkyl of 1–6 carbon atoms and $R^2$ is lower alkyl or hydrogen, with an ester-forming compound having the structure $Cl_m$—A—X where m is 1 or 2, A is

or P—O, n is 0–3 and X is an organic radical. The term "lower alkyl" denotes an alkyl group having 1–4 carbon atoms.

Illustrative species of R include methyl, ethyl, isopropyl, tertiarybutyl, tertiaryamyl, 2,2'-dimethylbutyl, cyclopentyl, cyclohexyl, 2-methylcyclohexyl, benzyl and phenylethyl; illustrative species of $R^1$ include methyl, ethyl, isopropyl, tertiarybutyl, tertiaryamyl and 2,2'-dimethylbutyl; illustrative species of $R^2$ include methyl, ethyl, n-propyl, isobutyl and hydrogen. Preferably, at least one of R and $R^1$ is a bulky group, e.g., tertiarybutyl, phenylethyl or cyclohexyl.

The organic radical X is an aromatic radical, i.e., it contains a benzene ring. It may be a substituted aryl group, i.e., an alkylphenyl group (where the alkyl has 1–6 carbons) such as 4-tertiarybutylphenyl, 2,4-ditertiarybutylphenyl or 2,6-diisopropylphenyl; or a hydroxyphenyl group such as 4-hydroxy-2-methyl-3-tertiarybutylphenyl, 4-hydroxy-2,3-ditertiarybutylphenyl or 4-hydroxy-2-tertiarybutyl-5-n-octylphenyl. The aromatic radical may be one which is attached directly to the A group, i.e., through a benzenoid carbon atom, or it may be attached through an aliphatic carbon atom, e.g., benzyl, 2-phenylethyl, 2-(4-hydroxyphenyl)ethyl and 2-(4-hydroxy-3,5-ditertiarybutylphenyl)ethyl.

In general, X is phenyl, alkylphenyl, or (hydroxyphenyl)alkyl, where the alkyl group(s) in each case have 1–6 carbon atoms.

The process of the invention involves reacting the above pentaerythritol acetal with the acid chloride under such conditions as to cause the evolution of hydrogen chloride. The reaction is slightly exothermic and it is accordingly advisable to employ external cooling to control the reaction. Stoichiometric quantities of the reactants should be employed for best results, i.e., two mols of carboxylic acid chloride per mol of pentaerythritol monoacetal, or one mol of the dichlorophosphite per mol of pentaerythritol monoacetal.

A hydrogen chloride acceptor is employed, usually a tertiary aliphatic amine such as triethylamine or tri-n-butyl amine, i.e., one having 3–12 carbon atoms, and the reaction is best carried out in a solvent. Typical solvents include toluene, dioxane, benzene, and the like. Any inert solvent is suitable. The temperature of the reaction ordinarily is within the range of from about 10° C. to about 100° C.

The reactants, solvent and hydrogen-chloride acceptor are mixed, stirred until reaction is complete and the desired solid product separated. If a pure product is desired, crystallization from a hot aliphatic hydrocarbon (such as hexane) usually will serve that purpose.

The process is illustrated by the following examples.

EXAMPLE 1

A mixture of 13.0 g. (0.034 mol) of the monoacetal of pentaerythritol and 3-(4-hydroxy-3,5-ditertiarybutylphenyl)propionaldehyde, 17.6 g. (0.066 mol) of 4-hydroxy-3,5-ditertiarybutylbenzoyl chloride and 115 ml. of toluene is stirred in an ice bath until the temperature is about 3° C. whereupon 11.5 ml. (8.38 g.–0.083 mol) of triethylamine is added. An exothermal reaction occurs and the temperature rises to 30° C. Stirring is continued for 45 minutes, then the mixture is heated to 80° C. and filtered. The filtrate is stripped to a residue weighing 33.0 g.; it is crystallized from hot hexane to yield 11.75 g. (42.5% of the theory) of white crystals, M.P., 123°–7° C.

EXAMPLE 2

A mixture of 9.59 g. (0.025 mol) of the monoacetal of pentaerythritol and 3-(4'-hydroxy-3',5'-ditertiarybutylphenyl)propionaldehyde, 10.4 ml. (7.6 g.–0.107 mol) of triethylamine and 90 ml. of dioxane is prepared and stirred until all is in solution; a solution of 15 g. (0.051 mol) of 3-(4'-hydroxy-3',5'-ditertiarybutylphenyl)propionyl chloride is added slowly with external cooling and stirring is continued for 90 minutes at room temperature after all is added. The temperature is raised to 80° C. and held there for 90 minutes, then the mixture is filtered. The filtrate is evaporated to dryness and the residue crystallized from hot hexane to yield 16.15 g. (71% of the theory) of the desired diester, M.P., 95°–100° C.

EXAMPLE 3

To a stirred mixture of 9.5 g. (0.025 mol) of the monoacetal of pentaerythritol and 3-(4'-hydroxy-3',5'-ditertiarybutylphenyl)propionaldehyde, 10 ml. (7.3 g.–0.103 mol) of triethylamine and 100 ml. of toluene there is added, with stirring, 7.68 g. (0.025 mol) of dichloro-2,4-ditertiarybutylphenyl phosphite. An exothermic reaction ensues and the temperature of the reaction is kept below 40° C. by means of an ice bath. When the reaction has subsided the product mixture is filtered and the filtrate is evaporated to 15.0 g. of a yellow, gummy residue. Crystallization from hot heptane yields 12.5 g. (81% of the theory) of a light yellow solid, M.P., 138°–140° C.

EXAMPLE 4

The procedure of Example 2 is repeated except that the monoacetal reactant is derived from 3-(2',3'-dimethyl-5'-tertiarybutylphenyl)propionaldehyde.

EXAMPLE 5

The procedure of Example 3 is repeated except that the phosphite reactant is dichloro-2,6-ditertiarybutylphenylphosphite.

Synthetic resins that can be stabilized with compositions comprising a polyhydric phenol ester according to this invention include alphaolefin polymers such as polyethylene, polypropylene, polybutene, poly-3-methylbutene, or copolymers thereof such as ethylenevinylacetate copolymer, ethylenepropylene copolymer, polystyrene, polyvinylacetate, acrylic ester resins, copolymers of styrene and another monomer (for example, maleic anhydride, butadiene, acrylonitrile, etc.), acrylonitrile-butadiene-styrene copolymer, acrylic acid ester-butadiene-styrene copolymer, methacrylic acid ester-butadiene-styrene copolymer, methacrylate ester resin such as polymethylmethacrylate, polyvinylalcohol, ethylene and butylene terephthalate polyesters, polyamide, polycarbonate, polyacetal, polyurethane, cellulosic resin, or phenolic resins, urea resin, melamine resin, epoxy resin, unsaturated polyester, silicone resin, halogen-containing resins such as polyvinyl chloride, polyvinylidene chloride, polyvinylidene fluoride and copolymers thereof, and other rubbers such as isoprene rubber, chloroprene rubber, and blends of the above resins.

Stabilizer compositions comprising an acetal ester according to this invention can be formulated and marketed in liquid, solid, and paste forms. An inert solvent can be used to facilitate handling. The acetal ester and known polymer stabilizers can also be solubilized in one another by heating, such as at 70°–160° C. for up to 4 hours, and then allowing the resulting melt to cool and harden sufficiently to be flaked and ground.

Known polymer stabilizers can be used in synthetic resin compositions together with the acetal esters of this invention and can be admixed with the latter. Such stabilizers include thiodipropionic acid esters, polyvalent metal salts of carboxylic acids, organic phosphites, 1,2-epoxides, polyhydric alcohols, polyhydric alcohol 3-alkylthiopropionic acid esters, ultraviolet absorbers and heavy metal deactivators. Representative thiodipropionic acid esters include di-n-dodecyl thiodipropionic, dihexadecyl thiodipropionate, distearyl thiodipropionate, n-octyl eicosanyl thiodipropionate and n-octadecyl cyclohexane-1,4-dimethanol thiodipropionate polyester. A comprehensive disclosure of useful thiodipropionate esters in U.S. Pat. No. 3,869,423, column 17 line 55 to column 19 line 54 is here incorporated by reference. When thiodipropionate esters are used the concentration based on 100 parts of polymer can range from 0.05 to about 0.75 parts by weight.

Representative polyvalent metal salts include zinc, calcium, magnesium, barium, strontium and nickel salts of monocarboxylic acids having 6 to 24 carbon atoms, for example zinc benzoate, calcium palmitate, and nickel 2-ethylbutyrate. A comprehensive disclosure of useful metal salts in U.S. Pat. No. 3,869,423, column 19 line 56 column 20 line 35, is here incorporated by reference. When metal salts are used the concentration based on 100 parts by weight of polymer can range from 0.1 to about 3 parts by weight.

Representative organic phosphites include triisodecylphosphite, tris(nonylphenylphosphite), and 4,4'-isopropylidene diphenol alkyl($C_{12}C_{15}$)phosphite. A comprehensive disclosure of useful organic phosphites in U.S. Pat. No. 3,849,370, column 13 line 63 to column 16 line 48, is here incorporated by reference. Typical use concentrations of organic phosphites are in the range from 0.02 part to about 2 parts by weight per 100 parts of polymer being stabilized.

Representative 1,2-epoxides that can be used in stabilizer compositions according to this invention include epoxysoybean oil, epoxylinseed oil, and 2-ethylhexyl epoxystearate. A comprehensive disclosure of 1,2-epoxides in U.S. Pat. No. 3,869,423, column 26 line 13 to line 39, is here incorporated by reference. Typical use concentrations of 1,2-epoxides range from 0.3 to about 6 parts by weight per 100 parts of synthetic resin composition.

Aliphatic polyhydroxy compounds can be included with stabilizer compositions of this invention in amounts corresponding to 0.1 to about 1 part per 100 parts of polymer being stabilized. Typical aliphatic polyhydroxy compounds are glycerol, polyglycerol, mono-, di-, and tri-pentaerythritol, mannitol, sorbitol, and partial esters of these with saturated and unsaturated fatty acids having 6 to 22 carbon atoms.

3-Alkylthiodipropionates of polyhydric alcohols can be included in stabilizer compositions of this invention in amounts corresponding to 0.02 to about 1 part per 100 parts of synthetic resin being stabilized. The propionate esters have 4 to about 34 carbon atoms in the alkylthiopropionate group, 2 to about 15 carbon atoms in the polyhydric alcohol group and 2 to about 8 ester groups in the molecule. Representative propionate esters are 2,2-dimethylpropanediol bis(3-n-dodecylthio-2-methylpropionate), pentaerythritol tetrakis(3-n-octylthiopropionate) and tris(3-n-octadecylthiopropionyloxyethyl)isocyanurate. For a further listing of useful 3-alkylthiopropionates the disclosure of U.S. Pat. No. 3,629,194 can be consulted.

Ultraviolet absorbers can be included in stabilizer compositions of this invention in amounts corresponding to 0.05 to about 1 part per 100 parts of synthetic resin being protected. Typical ultraviolet absorbers are 2-hydroxybenzophenones such as 2-hydroxy-4-n-octyloxybenzophenone and 2,4-dihydroxybenzophenone, and 2-(2'hydroxyphenyl)benzotriazoles such as 2-(2'-hydroxy-5-methylphenylbenzotriazole and 2(2'-hydroxy-5'-t-butylphenyl)5,6-dichlorobenzotriazole.

For a further listing of many useful ultraviolet absorbers the disclosure of U.S. Pat. No. 3,395,112, particularly column 14 line 40 to column 19 line 33, can be consulted. Stabilizer compositions according to this invention that protect synthetic resin compositions used in contact with materials containing heavy metals and their compounds, as in insulating materials for copper based electrical conductors or in compositions pigment with heavy metal containing pigments such as rouge, talc, and iron-bearing asbestos, can contain heavy metal deactivators that counteract the prodegradant effect of the heavy metal on synthetic resin compositions that would be satisfactorily stabilized in the absence of heavy metal. Heavy metal deactivators that can be used in stabilizer compositions according to this invention include melamine, dicyandiamide, oxanilide, N,N'-disalicyloylhydrazine, 3-salicyloylamido-1,2,4-triazole, as well as the heavy metal deactivators disclosed in U.S. Pat. Nos. 3,549,572 (column 5 line 19 to column 10 line 23), 3,629,181 (column 5 line 15 to column 9 line 54), 3,673,152 (column 4 line 47 to column 8 line 62), and 3,849,370 (column 5 line 5 to column 13 line 45). These disclosures are here incorporated by reference.

The efficacy of the acetal esters herein as polymer stabilizers is shown by the data set out in the Table below. The data is derived from thermal stability tests carried out at 150° C. Each sample is heated at this temperature and inspected at periodic intervals until it fails (as evidenced by embrittlement, crazing and/or cracking). The samples each consist of polypropylene containing 0.10 pph (parts per hundred parts of resin) calcium stearate and other additives as shown. Color ratings (Hunter L-b) are assigned to each sample prior to (initial) and after (Final) 600 hours at 150° C.

The stability rating is measured as the number of hours required for failure, and is the average of three samples.

| Acetal-Ester (pph) | | DSTDP (pph) | Color Initial | Color Final | Stability |
|---|---|---|---|---|---|
| Product of | 0.03 | 0.25 | 75.8 | 74.0 | — |
| Example 1 | 0.05 | 0.20 | — | — | 1264 |
|  | 0.05 | 0.30 | — | — | 1268 |
|  | 0.075 | 0.25 | 75.6 | 73.9 | 1632 |
|  | 0.075 | 0.30 | — | — | 1800 |
| Product of | 0.03 | 0.25 | 75.6 | 74.0 | 1304 |
| Example 2 | 0.05 | 0.20 | — | — | 1464 |
|  | 0.05 | 0.30 | — | — | 1664 |
|  | 0.75 | 0.25 | 74.8 | 72.1 | 1632 |
|  | 0.75 | 0.35 | — | — | 1824 |
| Product of | 0.05 | 0.25 | 74.3 | — |  |
| Example 3 | 0.10 | 0.25 | 74.5 | 67.9 |  |
| Product of | 0.05 | 0.25 |  |  | 1416 |
| Example 4 |  |  |  |  |  |
| Product of | 0.05 | 0.25 | 76.1 | — |  |
| Example 5 | 0.10 | 0.25 | 74.3 | 70.8 |  |
| None | — | 0.25 |  |  | 168 |

All parts and percentages herein, unless otherwise expressly stated, are by weight.

We claim:

1. An olefin polymer composition comprising an olefin polymer and a effective stabilizing amount of an ester of a pentaerythritol monoacetal having the structure

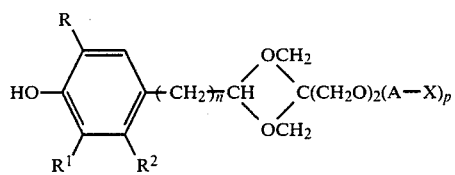

where R is alkyl, cycloalkyl or aralkyl having 3–10 carbon atoms, $r^1$ is alkyl or 1–6 carbon atoms, $R_2$ is lower alkyl or hydrogen, A is

X is alkyl phenyl or (hydroxy phenyl)alkyl where the alkyl in each case has 1–6 carbon atoms, n is 0–3 and p is 2.

2. An olefin polymer composition comprising polypropylene and a minor effective amount of the ester acetal of claim 1 wherein X is an aromatic group.

3. An olefin polymer composition comprising polypropylene and a minor effective amount of the ester acetal of claim 1 wherein X is a phenolic group.

4. An olefin polymer composition comprising polypropylene and a minor effective amount of the ester acetal of claim 1 wherein X is an alkylphenyl group.

5. An olefin polymer composition comprising polypropylene and minor effective amounts of the ester acetal of claim 1 and a dialkylthiodipropionate.

* * * * *